US011446760B2

(12) United States Patent
Ishikawa et al.

(10) Patent No.: US 11,446,760 B2
(45) Date of Patent: Sep. 20, 2022

(54) LASER MACHINING APPARATUS AND LASER MACHINING METHOD

(71) Applicant: Mitsubishi Electric Corporation, Chiyoda-ku (JP)

(72) Inventors: Kyohei Ishikawa, Tokyo (JP); Naoyuki Nakamura, Tokyo (JP); Tatsuya Yamamoto, Tokyo (JP); Masaki Seguchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 620 days.

(21) Appl. No.: 16/323,916

(22) PCT Filed: Sep. 5, 2017

(86) PCT No.: PCT/JP2017/031969
§ 371 (c)(1),
(2) Date: Feb. 7, 2019

(87) PCT Pub. No.: WO2018/047823
PCT Pub. Date: Mar. 15, 2018

(65) Prior Publication Data
US 2019/0193197 A1    Jun. 27, 2019

(30) Foreign Application Priority Data
Sep. 9, 2016 (JP) .............................. JP2016-177028

(51) Int. Cl.
*B23K 26/064* (2014.01)
*B23K 26/082* (2014.01)
*G02B 26/08* (2006.01)

(52) U.S. Cl.
CPC .......... *B23K 26/064* (2015.10); *B23K 26/082* (2015.10); *G02B 26/08* (2013.01)

(58) Field of Classification Search
CPC ..... B23K 26/064; B23K 26/082; G02B 26/08
(Continued)

(56) References Cited

U.S. PATENT DOCUMENTS 4,563,565 A * 1/1986 Kampfer ................. G02C 7/04
219/121.72
5,582,752 A * 12/1996 Zair ..................... B23K 26/082
219/121.85
(Continued)

FOREIGN PATENT DOCUMENTS

JP     11-133320 A    5/1999
JP     2002-1561 A    1/2002
(Continued)

OTHER PUBLICATIONS

International Search Report dated Nov. 14, 2017 in PCT/JP2017/031969 filed Sep. 5, 2017.

*Primary Examiner* — Jimmy Chou
(74) *Attorney, Agent, or Firm* — Xsensus LLP

(57) ABSTRACT

A laser machining apparatus includes: a laser oscillator to emit a laser beam; a focusing lens to irradiate a workpiece with the laser beam; a focus position control mechanism disposed between the laser oscillator and the focusing lens and disposed on the optical path of the laser beam and that controls the divergence angle of the laser beam and the incident diameter of the laser beam incident on the focusing lens; a laser beam deflector to deflect the laser beam before the laser beam is incident on the focusing lens; and an emitting angle control mechanism to control the emitting angle of the laser beam that exits from the focusing lens after being deflected by the laser beam deflector.

11 Claims, 11 Drawing Sheets

(58) Field of Classification Search
USPC .................................. 219/121.61, 121.75
See application file for complete search history.

(56) References Cited

U.S. PATENT DOCUMENTS

| | | | | |
|---|---|---|---|---|
| 5,837,962 | A * | 11/1998 | Overbeck | B23K 26/0665 219/121.68 |
| 6,353,203 | B1 * | 3/2002 | Hokodate | B23K 26/0648 219/121.67 |
| 7,456,372 | B2 * | 11/2008 | Hiramatsu | B23K 26/032 219/121.7 |
| 7,459,655 | B2 * | 12/2008 | Nomaru | B23K 26/0853 219/121.78 |
| 7,462,802 | B2 * | 12/2008 | Hiramatsu | B23K 26/03 219/121.71 |
| 7,680,163 | B2 * | 3/2010 | Shida | B23K 26/04 372/34 |
| 8,040,622 | B1 * | 10/2011 | Schuster | G02B 7/028 359/824 |
| 8,796,582 | B2 * | 8/2014 | Kawai | B23K 26/0884 219/121.63 |
| 8,804,238 | B2 * | 8/2014 | Rupp | G02B 27/09 359/432 |
| 9,174,304 | B2 | 11/2015 | Minehara | |
| 9,289,850 | B2 * | 3/2016 | Yamamoto | B23K 26/0643 |
| 2001/0045419 | A1 * | 11/2001 | Dunsky | H05K 3/0038 219/121.76 |
| 2003/0168434 | A1 * | 9/2003 | Gross | B23K 26/064 219/121.7 |
| 2003/0192867 | A1 * | 10/2003 | Yamazaki | B23K 26/08 219/121.78 |
| 2004/0222197 | A1 * | 11/2004 | Hiramatsu | B23K 26/067 219/121.7 |
| 2007/0080147 | A1 * | 4/2007 | Hertzberg | B23K 26/103 219/121.75 |
| 2009/0045176 | A1 * | 2/2009 | Wawers | G02B 27/642 219/121.67 |
| 2010/0177253 | A1 * | 7/2010 | Golub | H04N 9/3161 353/38 |
| 2011/0259860 | A1 * | 10/2011 | Bass | B23K 26/40 219/121.7 |
| 2013/0175243 | A1 * | 7/2013 | Wang | B23K 26/382 219/121.7 |
| 2013/0341309 | A1 * | 12/2013 | Yamamoto | B23K 26/046 219/121.61 |
| 2014/0083986 | A1 * | 3/2014 | Zhang | B23K 26/40 219/121.69 |
| 2016/0001402 | A1 * | 1/2016 | Martinsen | B23K 26/361 264/400 |
| 2019/0001436 | A1 * | 1/2019 | Conseil | B23K 26/355 |
| 2019/0126395 | A1 * | 5/2019 | Nakamura | B23K 26/38 |
| 2020/0189029 | A1 * | 6/2020 | Ishiguro | B23K 26/073 |

FOREIGN PATENT DOCUMENTS

| | | | |
|---|---|---|---|
| JP | 2002-316289 | A | 10/2002 |
| JP | 2002316289 | * | 10/2002 |
| JP | 2004-358507 | A | 12/2004 |
| JP | 2008-114059 | A | 5/2008 |
| JP | 2010-23100 | A | 2/2010 |
| JP | 2013-108977 | A | 6/2013 |
| JP | 2015-214771 | A | 12/2015 |

* cited by examiner

WHEN LASER BEAM L IS
PERPENDICULAR TO WORKPIECE W,
LASER BEAM L TRAVELS DISTANCE
OF t THROUGH WORKPIECE W

WHEN LASER BEAM L IS NOT
PERPENDICULAR TO WORKPIECE W,
LASER BEAM L TRAVELS DISTANCE
OF $t/\cos\theta$ THROUGH WORKPIECE W

LASER MACHINING APPARATUS AND LASER MACHINING METHOD

FIELD

The present invention relates to a laser machining apparatus and a laser machining method for performing machining by laser beam irradiation.

BACKGROUND

In order for difficult-to-machine material like semiconductor thin film or composite material such as carbon fiber reinforced plastic (CFRP) to be machined by a laser and in consideration of the thermal effects on the material being machined, it is necessary to sweep, i.e., scan, the laser over the mater a plurality of times to machine the material.

CITATION LIST

Patent Literature

Patent Literature 1: Japanese Patent Application Laid-open No. 2015-214771

SUMMARY

Technical Problem

The technique disclosed in Patent Literature 1 is a method of cutting fiber reinforced base material by irradiating a cutting line on the workpiece with a laser beam a plurality of times. In Patent Literature 1, by irradiating the cutting line with the laser beam a plurality of times, the thermal effects on the fiber reinforced base material, which is the workpiece, are reduced.

However, in cases where a workpiece has a curved surface, rotation of the workpiece or rotation of the entire machining optical system that comes downstream of the laser oscillator is required in order to uniformize both the irradiation diameter, which is the diameter of a focused laser beam, and the incidence angle of the laser beam with respect to the workpiece. In cases where the workpiece is made from difficult-to-machine material that needs to be machined by being irradiated with a laser beam a plurality of times, the above movements are difficult to achieve while sweeping the laser beam over the material a plurality of times. Thus, with a difficult-to-machine workpiece that has curvature, the irradiation diameter of the laser beam and the incidence angle of the laser beam with respect to the workpiece change while sweeping the laser beam over the workpiece and thus machining conditions also change. Consequently, machining of a difficult-to-machine workpiece having curvature involves reduced productivity compared with machining a flat surface where the irradiation diameter of the laser beam and the incidence angle of the laser beam with respect to a workpiece are uniform.

The present invention has been made in view of the above, and an object of the present invention is to obtain a laser machining apparatus that can make machining conditions uniform while sweeping the laser beam over a workpiece having curvature.

Solution to Problem

To solve the above-mentioned problem and to achieve object, the laser machining apparatus according to an aspect of the present invention includes: a laser oscillator to emit a laser beam; a focusing lens to irradiate a workpiece with the laser beam; and a focus position control mechanism to control a divergence angle of the laser beam and an incident diameter of the laser beam incident on the focusing lens, the focus position control mechanism being disposed between the laser oscillator and the focusing lens and being disposed on an optical path of the laser beam. The laser machining apparatus according to an aspect of the present invention further includes a laser beam deflector to deflect the laser beam before the laser beam is incident on the focusing lens; and an emitting angle control mechanism to control an emitting angle of the laser beam that exits from the focusing lens after being deflected by the laser beam deflector.

Advantageous Effect of Invention

The present invention can produce an effect in which it is possible to obtain a laser machining apparatus that can make machining conditions uniform while sweeping the laser beam over a workpiece having curvature.

DESCRIPTION OF EMBODIMENTS

With reference to the drawings, a laser machining apparatus and a laser machining method according to embodiments of the present invention will be described below in detail. It is to be noted that the present invention is not limited to the embodiments.

First Embodiment

Figure 1:
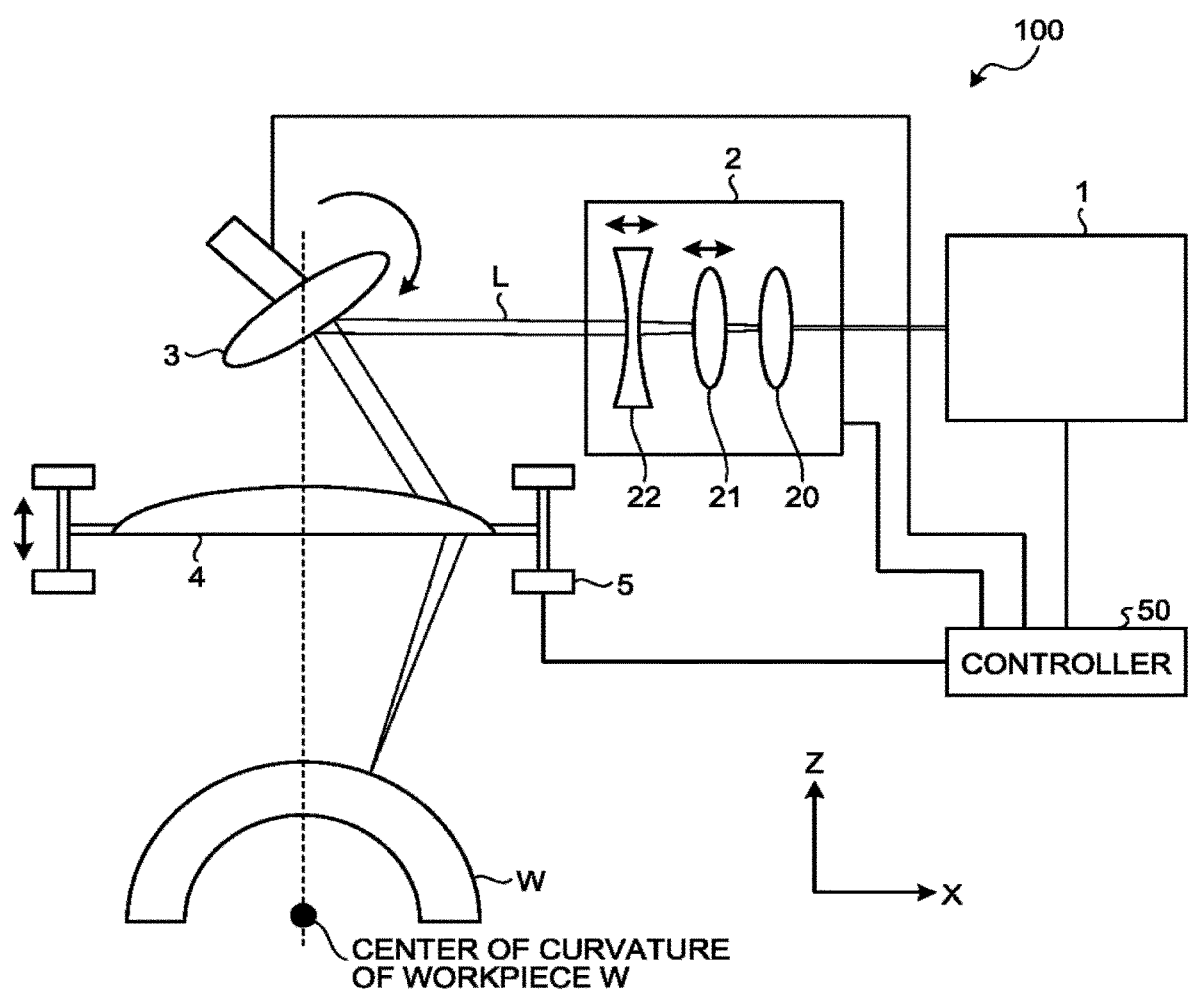
FIG. 1 is a sectional view illustrating a configuration of a laser machining apparatus according to a first embodiment of the present invention.

FIG. 1 is a sectional view illustrating a configuration of a laser machining apparatus 100 according to a first embodiment of the present invention. FIG. 1 illustrates an X direction and a Z direction, with a direction perpendicular to the paper surface being a Y direction. The laser machining apparatus 100 includes a laser oscillator 1 that emits a laser beam L; a focus position control mechanism 2 that controls the focus position of the laser beam L; a galvano scanner 3 that deflects the laser beam L; a focusing lens 4 that irradiates a workpiece N with the laser beam L; an incident position control mechanism 5 that controls the incident position of the laser beam L on the focusing lens 4; and a controller 50. The focus position control mechanism 2 is disposed between the laser oscillator 1 and the focusing lens 4 on the optical path of the laser beam L. The galvano scanner 3, which is a laser beam deflector, is disposed at a position where the galvano scanner 3 can deflect the laser beam L before the laser beam L enters the focusing lens 4. The controller 50 controls the laser oscillator 1, the focus position control mechanism 2, the galvano scanner 3, and the incident position control mechanism 5.

Figure 2:
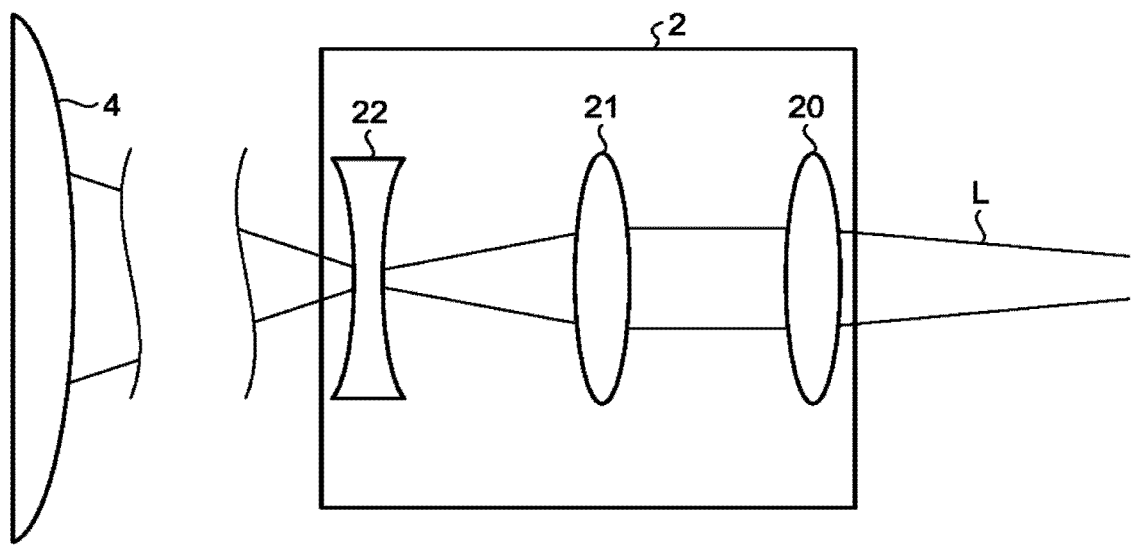
FIG. 2 is a sectional view illustrating an example of the optical arrangement of lenses in a focus position control mechanism according to the first embodiment.
Figure 3:
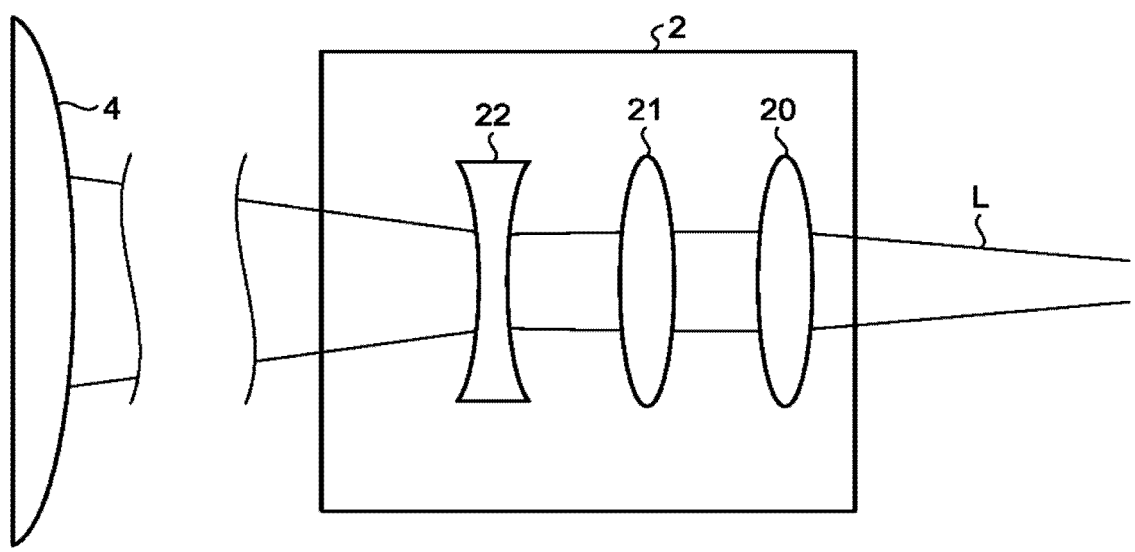
FIG. 3 is a sectional view illustrating another example of the optical arrangement of the lenses in the focus position control mechanism according to the first embodiment.
Figure 4:
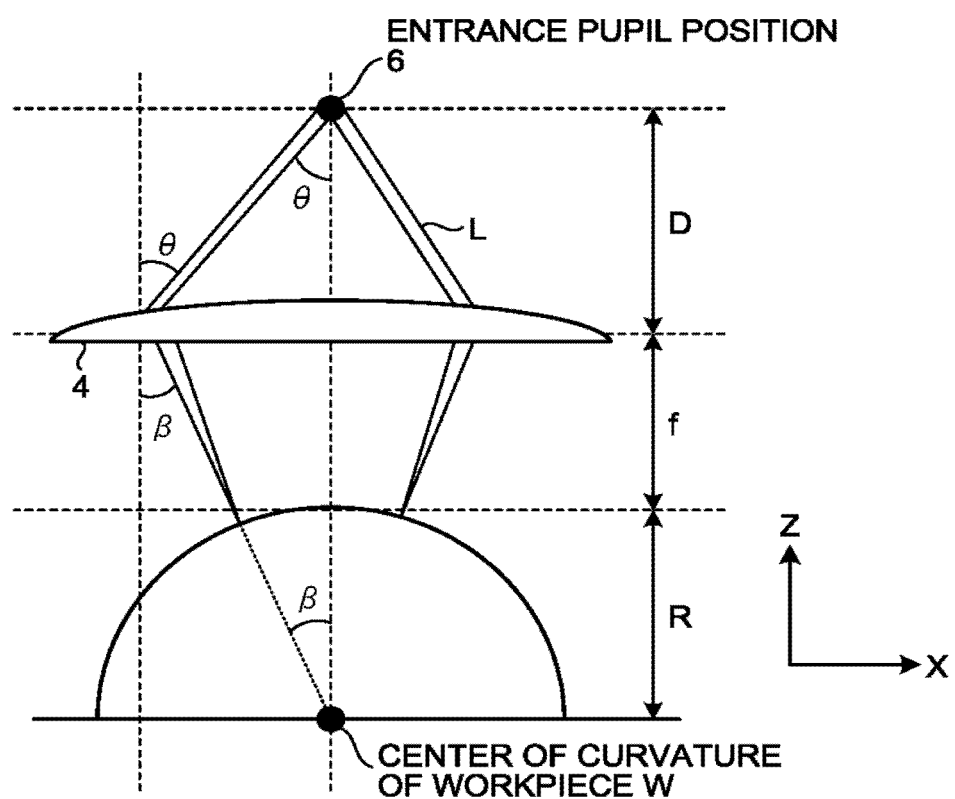
FIG. 4 is a diagram illustrating the relationship among an entrance pupil position, a focusing lens, and a workpiece according to the first embodiment.

FIG. 2 is a sectional view illustrating an example of the optical arrangement of lenses 20, 21, and 22 in the focus position control mechanism 2 according to the first embodiment. FIG. 3 is a sectional view illustrating another example of the optical arrangement of the lenses 20, 21, and 22 in the focus position control mechanism 2 according to the first embodiment. In FIGS. 2 and 3, the focusing lens 4 and the laser beam L entering the focusing lens 4 are illustrated, but the galvano scanner 3 and others are omitted. FIG. 4 is a diagram illustrating the relationship among an entrance pupil position 6, the focusing lens 4, and the workpiece W according to the first embodiment.

The laser beam L emitted from the oscillating laser oscillator 1 passes through the focus position control mechanism 2 made up of a group of a plurality of lenses, and its position and angle of incidence on the focusing lens 4 are controlled by the galvano scanner 3. The laser beam L then passes through the focusing lens 4, whereby the workpiece W is irradiated with the focused laser beam L.

A plurality of lenses included in the focus position control mechanism 2 are the lenses 20, 21, and Each of the lenses 20, 21, and 22 that form an optical element group is provided with a drive mechanism to allow independent movement along the optical axis and thus the optical arrangement of the lenses 20, 21, and 22 is controlled.

The optical arrangement in FIG. 3 obtained by independent control of the lenses 21 and 22 in the focus position control mechanism 2 enables the laser beam L to have a smaller divergence angle when exiting from the lens 22 but have the same incident diameter when entering the focusing lens 4 compared with the optical arrangement in FIG. 2.

As described above, the incident diameter of the laser beam L incident on the focusing lens 4 and the divergence angle of the laser beam L exiting from the focus position control mechanism 2 can be controlled by the optical arrangement of the lenses 20, 21, and 22 in the focus position control mechanism 2.

In FIG. 1, the optical axis of the focusing lens 4 corresponds with the Z direction as indicated by the broken line, while the scanning direction of the galvano scanner 3 corresponds with the Y direction. Because the focus position control mechanism 2 can control the incident diameter of the laser beam L incident on the focusing lens 4 and the divergence angle of the laser beam L exiting from the focus position control mechanism 2, the irradiation diameter of the laser beam L that irradiates the surface of the workpiece W and the focus position of the laser beam L in the Z direction can be controlled. While the focus position control mechanism 2 can be disposed anywhere between the focusing lens 4 and the laser oscillator 1, the focus position control mechanism 2 is preferably disposed between the laser oscillator 1 and the galvano scanner 3. The focus position control mechanism 2 only needs to be capable of controlling the incident diameter of the laser beam L incident on the focusing lens 4 and the divergence angle of the laser beam L exiting from the focus position control mechanism 2. Thus, the lenses may not necessarily be arranged as illustrated in FIG. 1, and the movable lens may be more than two in number.

The incident position control mechanism 5 is provided to the focusing lens 4. In the first embodiment, the incident position control mechanism 5 is a mechanism that moves the focusing lens 4 in the Z direction corresponding to the optical axis to change the Z-direction distance between the galvano scanner 3 and the focusing lens 4.

The incident position control mechanism 5 positions the entrance pupil position 6 on the optical axis of the focusing lens 4 such that it is on the galvano scanner 3. This enables the galvano scanner 3 to change the incidence angle of the laser beam L with respect to the focusing lens 4 at the entrance pupil position 6. By changing the Z-direction distance between the galvano scanner 3 and the focusing lens 4, the incident position control mechanism 5 can adjust the incident position of the laser beam L on the focusing lens 4. Such adjustment of the incidence angle and the incident position of the laser beam L with respect to the focusing lens 4 can change the emitting angle of the laser beam L exiting from the focusing lens 4. In other words, the incident position control mechanism is also an emitting angle control mechanism that changes the emitting angle of the laser beam L exiting from the focusing lens 4. Consequently, with the incident position control mechanism 5 provided, the incidence angle of the laser beam L with respect to the workplace P can be changed.

In FIG. 4, θ is the incidence angle of the laser beam L deflected by the galvano scanner 3 with respect to the focusing lens 4, β is the emitting angle of the lacer beam L with respect to the focusing lens 4, D is the Z-direction distance between the galvano scanner 3 and the focusing lens 4, f is the focal length of the focusing lens 4, and R is the radius of curvature of the workpiece W. With the entrance pupil position 6 being set on the galvano scanner 3 by the incident position control mechanism 5, the distance D is the Z-direction distance between the entrance pupil position 6 and the focusing lens 4.

It is o be noted here that when the entrance pupil position 6 and the center of curvature of the workpiece W are on the optical axis of the focusing lens 4, the following Formulas (1) and (2) hold as relational expressions if the workpiece W has no curvature change in the irradiation range of the laser beam L.

[Formula 1]

$$\tan\beta = \frac{D\tan\theta}{f+R} \quad (1)$$

[Formula 2]

$$\tan\beta = \frac{f\tan\theta}{R} \quad (2)$$

From the above Formulas (1) and (2), the following Formula (3) can be derived for the distance D.

[Formula 3]

$$D = \frac{f}{R}(f+R) \quad (3)$$

In a case where the workpiece W has a planar shape, the radius of curvature R of the workpiece W here is considered infinite.

According to the above Formula (3), if the focal length f of the focusing lens 4 is constant, the Z-direction distance ID between the galvano scanner 3 and the focusing lens 4 can be determined by the radius of curvature R. It is to be noted here that the workpiece W is of convex shape when its radius of curvature R is positive, and the workpiece W is of concave shape when its radius of curvature R is negative.

When the convex workpiece W is machined, the direction distance D between the galvano scanner 3 and the focusing lens 4 is set greater than the focal length f of the focusing lens 4, whereby the laser beam L is directed toward the center of curvature of the workpiece W after passing through the focusing lens 4. Because a tangent to a circle perpendicularly intersects a line segment that has a length of a radius connecting the center of the circle and a point of tangency, the laser beam L can be made to be perpendicularly incident on the workpiece W.

Figure 5:
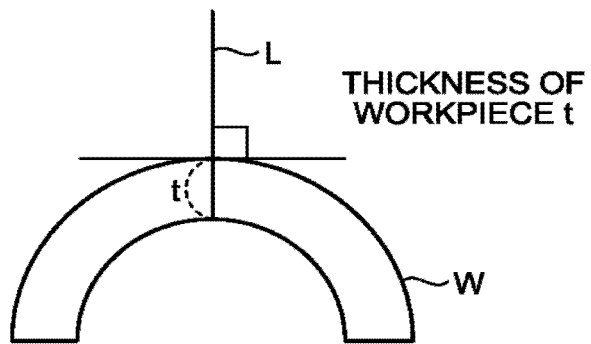
FIG. 5 is a diagram illustrating an example of the relationship between the thickness of the workpiece and the incidence angle of a laser beam according to the first embodiment.
Figure 6:
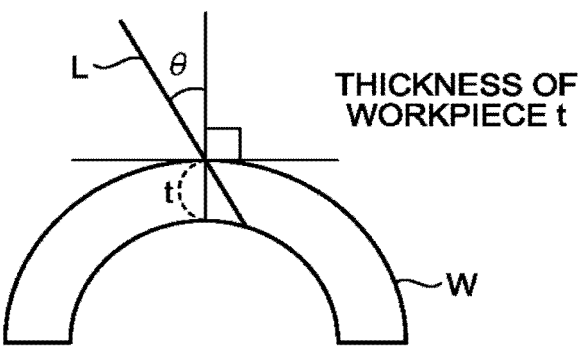
FIG. 6 is a diagram illustrating another example of the relationship between the thickness of the workpiece and the incidence angle of the laser beam according to the first embodiment.

FIG. 5 is a diagram illustrating an example of the relationship between the thickness of the workpiece W and the incidence angle of the laser beam L according to the first embodiment. FIG. 6 is a diagram illustrating another example of the relationship between the thickness of the workpiece W and the incidence angle of the laser beam L according to the first embodiment.

In FIGS. 5 and 6, the thickness of the workpiece W is t. If the laser beam L is incident on the workpiece W at an angle of θ as illustrated in FIG. 6, the laser beam L travels a distance of t/cosθ through the workpiece W. If the laser beam L is perpendicularly incident on the workpiece W as illustrated in FIG. 5, the laser beam L travels a minimum distance of t through the workpiece W. This means that by making the laser beam L perpendicularly incident on the workpiece W and thus by causing the laser beam L to travel the minimum distance through the workpiece W, efficient machining can be carried out.

Concave workpieces W have negative radii of curvature R; therefore, methods of machining the concave workpieces W are divided into two types, depending on whether the distance D obtained by Formula (3) is positive or negative.

Figure 7:
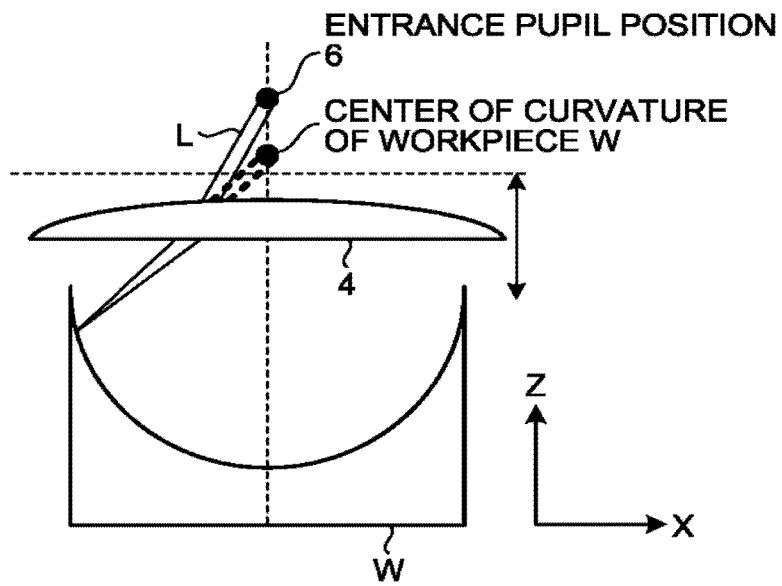
FIG. 7 is a sectional view illustrating an example of the control performed by an incident position control mechanism according to the first embodiment.
Figure 8:
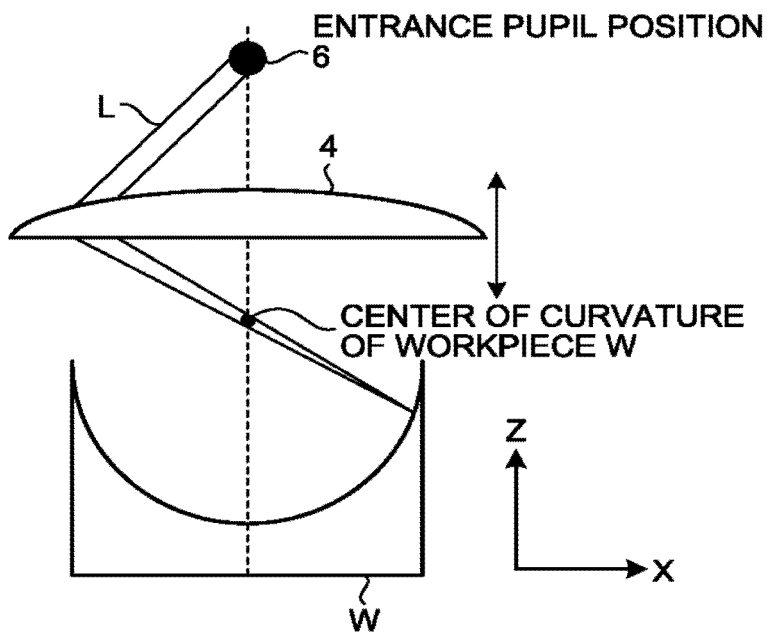
FIG. 8 is a sectional view illustrating another example of the control performed by the incident position control mechanism according to the first embodiment.

FIG. 7 is a sectional view illustrating an example of the control performed by the incident position control mechanism 5 according to the first embodiment. FIG. 8 is a sectional view illustrating another example of the control performed by the incident position control mechanism 5 according to the first embodiment. It is to be noted that the incident position control mechanism 5 itself is omitted from FIGS. 7 and 8. In FIGS. 7 and 8, although omitted from these drawings, the galvano scanner 3 is actually located at the entrance pupil position 6.

When the distance D obtained by Formula (3) is positive, the incident position control mechanism 5 performs such control as to position the focusing lens 4 below the center of curvature of the workpiece W as illustrated in FIG. 7. By setting the Z-direction distance between the galvano scanner 3 and the focusing lens 4 smaller than the focal length f of the focusing lens 4 by the incident position control mechanism 5 as illustrated in FIG. 7, such an arrangement is obtained where a line that is extended back (indicated by the thick dotted lines) in a direction opposite to the direction in which the laser beam L heads ward the workpiece W after passing through the focusing lens 4 crosses the center of curvature of the workpiece W. Because a tangent to a circle perpendicularly intersects a line segment that has a length of a radius connecting the center of the circle and a point of tangency, the arrangement in FIG. 7 enables the laser beam L to be perpendicularly incident on the workpiece W.

When the distance D obtained by Formula (3) is negative or when the galvano scanner 3 collides with the focusing lens 4 because it has a greater size than the absolute value of the distance D obtained by Formula (3), the incident position control mechanism 5 performs such control as to position the focusing lens 4 above the center of curvature of the workpiece W as illustrated in FIG. 8.

When the distance D is negative or when the size of the galvano scanner 3 is greater than the absolute value of the distance D, a line that is extended back in a direction opposite to the direction in which the laser beam L heads toward the workpiece W after passing through the focusing lens 4 cannot cross the center of curvature of the workpiece W, which is unlike the one indicated by the dotted lines in FIG. 7. Thus, by setting the Z-direction distance between the galvano scanner 3 and the focusing lens 4 greater than the focal length f of the focusing lens 4, the incident position control mechanism 5 causes, as illustrated in FIG. 8, the laser beam L to pass through the center of curvature of the workpiece W when heading toward the workpiece W after passing through the focusing lens 4. Because a tangent to a circle perpendicularly intersects a line segment that has a length of a radius connecting the center of the circle and a point of tangency, the arrangement in FIG. 8 enables the laser beam L to be perpendicularly incident on the workpiece W.

When difficult-to-machine material is machined, the laser beam L sweeps, i.e., scans or makes passes, over the material not only once but generally a plurality of times to machine the workpiece W because the thermal effects on the workpiece W must be taken into consideration. For this reason, the perpendicular relationship between the workpiece W having a curved surface and the laser beam L that irradiates the workpiece W needs to be maintained while sweeping the laser beam L over the workpiece N, and this can be achieved with the laser machining apparatus 100 according to the first embodiment. The laser machining apparatus 100 can also be used for three-dimensional cutting of metal.

It is to be noted that in cases where an oblique angle of incidence of the laser beam L on the workpiece W increases productivity, adjustment of the value of the distance D with respect to a radius of curvature R of the workplace W enables the laser beam L to be obliquely incident on the workpiece W.

By being provided with the focus position control mechanism that can control the divergence angle and the incident diameter of the laser beam L incident on the focusing lens 4, the laser machining apparatus 100 can adjust the focus position along the optical axis of the focusing lens 4 for the laser beam L emitted from the focusing lens 4 and the irradiation diameter of the laser beam L. Thus, with regard to the workplace W having a curved surface or the workpiece W having such a shape that its portion located in a laser beam sweeping range is not in a plane perpendicular to the optical axis of the focusing lens 4, during sweeping by the laser beam, the focus position of the laser beam L exiting from the focusing lens 4 can be adjusted onto the workpiece W and the irradiation diameter of the laser beam L can be adjusted.

By being provided with the incident position control mechanism 5 that controls the incident position of the deflected laser beam L on the focusing lens 4, the laser machining apparatus 100 can control the emitting angle of the laser beam L exiting from the focusing lens 4, i.e., the incidence angle of the laser beam L with respect to the workpiece W. Thus, the workplace P having the above-described shape can have its surface irradiated with the perpendicular laser beam L by adjusting the incidence angle of the laser beam L with respect to the workpiece W. In the laser machining apparatus 100, the controller 50 uses computer-aided design (CAD) data on the workpiece M to identify the shape of the workplace W beforehand and then causes the focus position control mechanism 2 to arrange the optical elements in conformity with the shape of the workpiece W; therefore, the laser beam L can be adjusted to a Z-axis focus position on the shape into which the workpiece W is being machined. It is to be noted that identification of the shape of the workpiece W by means of the CAD data may be carried out outside the controller 50, and shape data on the workpiece W may be given to the controller 50. The laser beam L can also be made incident at an incidence angle that is adjusted, by the incident position control mechanism 5, in accordance with the curvature of the shape into which the workpiece W is being machined.

By being provided with the focus position control mechanism 2 and the incident position control mechanism 5, the laser machining apparatus 100 can, in other words, uniformize machining conditions while sweeping the laser beam L over the workpiece P having curvature in the Z direction that corresponds with the optical axis of the focusing lens 4. Consequently, a decline in machining speed relative to the machining speed when machining a flat surface, i.e., the irradiation diameter of the laser beam L and the incidence angle of the laser beam L with respect to the workpiece W are uniform, can be reduced. Moreover, machining quality can be prevented from varying depending on the shape of the workpiece W. Furthermore, higher productivity is achieved for three-dimensional machining than when a machining head or the workpiece W is rotated.

The focusing lens 4 only needs to be capable of focusing the laser beam L and thus may be one lens or a combination of a plurality of lenses. Another alternative is to use an fθ lens that maintains the relationship that the sweeping position of the focusing lens 4 is fθ, where θ is the deflection angle of the galvano scanner 3 with respect to the focal length f of the focusing lens 4.

In FIG. 1, the laser machining apparatus 100 is provided with one galvano scanner 3, which is capable of rotating about a Y-axis that is perpendicular to the paper surface. However, when the workpiece W with a three-dimensional shape is machined, it is necessary to add another galvano scanner 3 capable of rotating about another axis. For example, the galvano scanner 3 that is capable of rotating about an X-axis is added. In this case, the incident position control mechanism 5 may position the entrance pupil position 6 of the focusing lens 4 at midpoint between those two galvano scanners 3 for rotation about the X-axis and for rotation about the Y-axis.

The incident position control mechanism 5 that changes the Z-direction distance D between the galvano scanner 3 and the focusing lens 4 may be provided not for the focusing lens 4 but for the galvano scanner 3. Alternatively, the galvano scanner 3 and the focusing lens 4 may each be provided with the incident position control mechanism 5.

The galvano scanner 3 only needs to be capable of deflecting the laser beam L; therefore, an acousto-optic deflector (AOD) that uses acousto-optic modulation of light waves or an electric modulation deflector that uses an electro-optic effect may be used instead.

The focus position control mechanism 2 only needs to be capable of controlling the incident diameter and the divergence angle of the laser beam L incident on the focusing lens 4 and thus may include one lens or a plurality of lenses. Alternatively, the focus position control mechanism 2 may include not lenses but a mirror. The focus position control mechanism 2 may change not only the relationship among the lenses in their optical arrangement but also the arrangement and orientation of the mirror or the radius of curvature of, for example, the lens in order to control the incident diameter and the divergence angle of the laser beam L incident on the focusing lens 4.

The incident diameter and the divergence angle of the laser beam L incident on the focusing lens 4 can also be adjusted by curvature adjustment or replacement of the outer surface of a partially reflecting mirror of the laser oscillator 1; therefore, the partially reflecting mirror of the laser oscillator 1 may be included in the focus position control mechanism 2.

In the above description, the laser machining apparatus 100 according to the first embodiment has such a configuration that the laser oscillator 1, the focus position control mechanism 2, the galvano scanner 3, and the incident position control mechanism 5 that are constituent elements each having an operation control mechanism are combined with the focusing lens 4 that is a constituent element not having an operation control mechanism. However, the laser machining apparatus 100 according to the first embodiment is not limited to such a configuration. The laser machining apparatus 100 can be formed as a combination of a constituent element having an operation control mechanism and a constituent element that has only a drive mechanism and has its operation controlled by the controller 50.

This means that the incident position control mechanism 5, for example, may have only a mechanism that shifts the incident position of the laser beam L on the focusing lens 4 and thus may shift the incident position in response to a signal from the controller 50.

The focus position control mechanism 2, for example, may have only a mechanism that shifts the focus position of the laser beam L and thus may shift the focus position in response to a signal from the controller 50.

The galvano scanner 3, which is the laser beam deflector, for example, may have only a mechanism that deflects the laser beam L and thus may deflect the laser beam L in response to a signal from the controller 50.

It goes without saying that some of the constituent elements of the laser machining apparatus 100 may each have a mechanism that controls its own operation, while each of the other constituent elements may have only a drive mechanism and thus may have its operation controlled by the controller 50.

Second Embodiment

Figure 9:
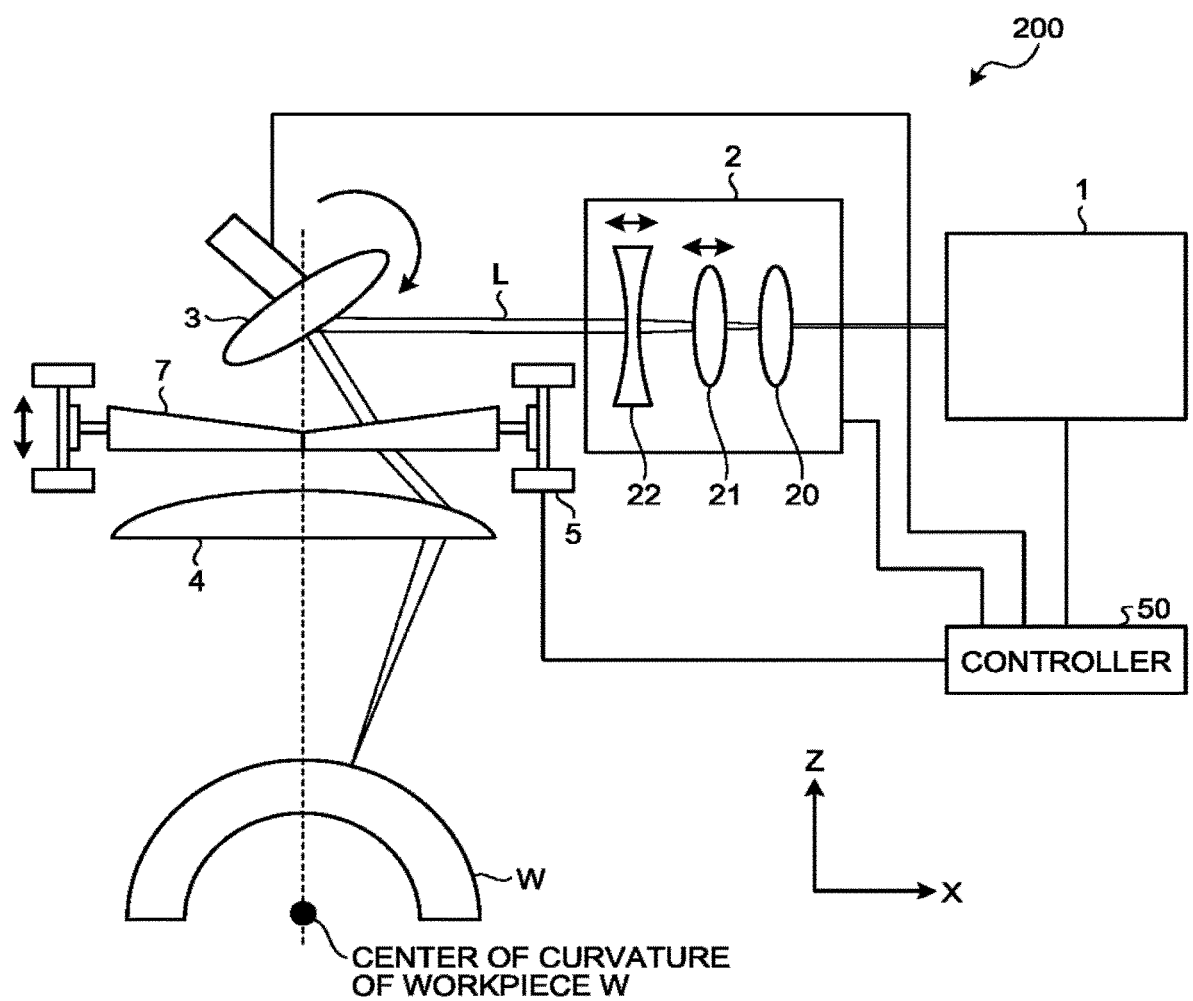
FIG. 9 is a sectional view illustrating a configuration of a laser machining apparatus according to a second embodiment of the present invention.

FIG. 9 is a sectional view illustrating a configuration of a laser machining apparatus 200 according to a second embodiment of the present invention. FIG. 9 illustrates an X direction and a 2 direction, with a direction perpendicular to the paper surface being a Y direction. The optical axis of the focusing lens 4 corresponds with the Z direction as indicated by the broken line. The laser machining apparatus 100 according to the first embodiment has the incident position control mechanism 5 provided to the focusing lens 4, whereas the laser machining apparatus 200 according to the second embodiment has the incident position control mechanism provided to a wedged substrate 7 inserted between the galvano scanner 3 and the focusing lens 4. The incident position control mechanism 5 adjusts the position of the wedged substrate 7 along the optical axis of the focusing lens 4, whereby the entrance pupil position 6 of the focusing lens 4 is shifted via the wedged substrate 7. The wedged substrate 7 illustrated in FIG. 9 is structurally symmetrical about the optical axis of the focusing lens 4. Except for the wedged substrate 7 and the incident position control mechanism 5, the configuration and operation of the laser machining apparatus 200 are similar to those of the laser machining apparatus 100 according to the first embodiment.

In the laser machining apparatus 200 of FIG. 9, the laser beam L emitted from the laser oscillator 1 passes through the focus position control mechanism 2 and reaches the galvano scanner 3 as in the laser machining apparatus 100 according to the first embodiment. In the laser machining apparatus 200, positioning the galvano scanner 3 determines the incidence angle of the laser beam L with respect to the wedged substrate 7. The laser beam L that has entered from the galvano scanner 3 and passed through the wedged substrate 7 is focused by passing through the focusing lens 4 to irradiate the workpiece W.

Figure 10:
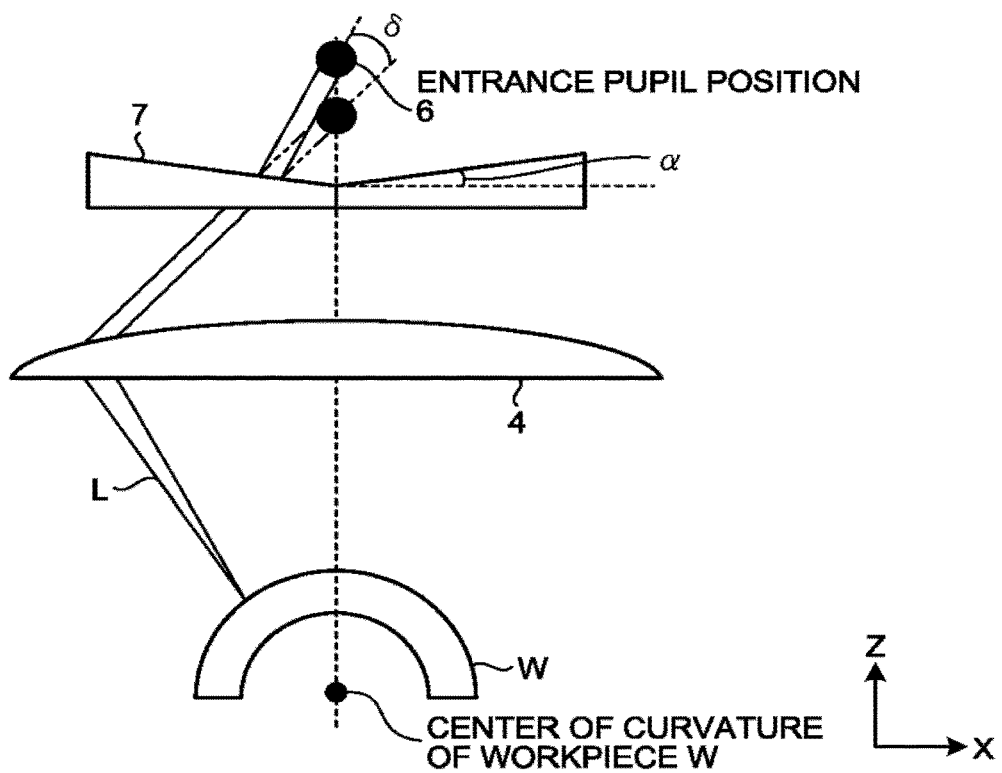
FIG. 10 is a sectional view illustrating an example of the control performed by an incident position control mechanism according to the second embodiment.
Figure 11:
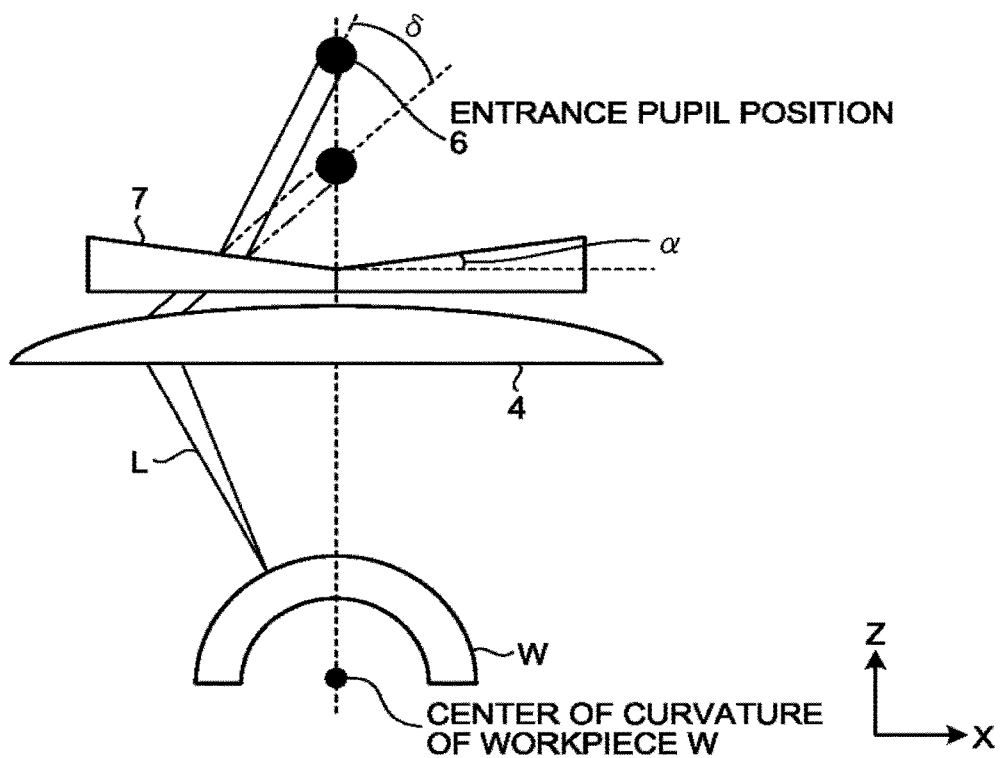
FIG. 11 is a sectional view illustrating another example of the control performed by the incident position control mechanism according to the second embodiment.

FIG. 10 is a sectional view illustrating an example of control performed by the incident position control mechanism 5 according to the second embodiment. FIG. 11 is a sectional view illustrating another example of the control performed by the incident position control mechanism 5 according to the second embodiment. It is to be noted that the incident position control mechanism 5 itself is omitted from FIGS. 10 and 11. In FIGS. 10 and 11, although omitted from these drawings, the galvano scanner 3 is actually located at the entrance pupil position 6.

As illustrated in FIGS. 10 and 11, insertion of the wedged substrate 7 between the galvano scanner 3 located at the entrance pupil position 6 and the focusing lens 4 enables the entrance pupil position 6 of the focusing lens 4 to be shifted. The deflection angle δ of the laser beam L is expressed by the following formula:

$$\delta = \sin^{-1}(n \times \sin\alpha) - \alpha \approx n-1)\alpha,$$

where n is the refractive index of the wedged substrate 7, and α is the wedge angle of the wedged substrate 7.

The incident position control mechanism 5 moves the wedged substrate 7 in the Z direction that corresponds with the optical axis of the focusing lens 4, whereby the entrance pupil position 6 of the focusing lens 4 can be shifted. Consequently, the incident position of the laser beam L on the focusing lens 4 can be controlled. In the laser machining apparatus 200, after the shape of the workpiece W is identified, optical elements of the focus position control mechanism 2 are arranged in conformity with the shape of the workpiece W; therefore, the laser beam L can be adjusted to a Z-axis focus position on the shape into which the workpiece W is being machined. The laser beam L can also be made incident at an incidence angle that is adjusted, by the incident position control mechanism 5, in accordance with the curvature of the shape into which the workpiece W is being machined.

In the laser machining apparatus 200 provided with the wedged substrate 7 inserted between the galvano scanner 3 and the focusing lens 4, the incident position control mechanism 5 shifts the entrance pupil position 6 of the focusing lens 4. In this way, the surface of the workpiece W can be irradiated with the laser beam L that is perpendicular thereto. Consequently, machining conditions can be made uniform while sweeping the laser beam L over the workpiece W having curvature in the Z direction, and a decline in machining speed relative to the machining speed when machining a flat surface can be reduced. Moreover, machining quality can be prevented from varying depending on the shape of the workpiece W. Furthermore, higher productivity is achieved for three-dimensional machining than when a machining head or the workpiece W is rotated.

In the above description, the wedged substrate 7 is moved in the 2 direction by the incident position control mechanism 5 with the galvano scanner 3 and the focusing lens 4 fixed in the Z direction. However, the incident position control mechanism 5 may have a function of moving the galvano scanner 3, the focusing lens 4, or both in the Z direction. In cases where the incident position control mechanism 5 has a function of moving the galvano scanner 3, the focusing lens 4, or both in the Z direction, the incident position control mechanism 5 may not necessarily have a function of moving the wedged substrate 7 in the Z direction.

By being provided with the wedged substrate 7 and using the incident position control mechanism 5 having a different configuration from that of the incident position control mechanism of the laser machining apparatus 100 in the first embodiment, the laser machining apparatus 200 according to the second embodiment can obtain effects similar to those of the first embodiment.

Third Embodiment

Figure 12:
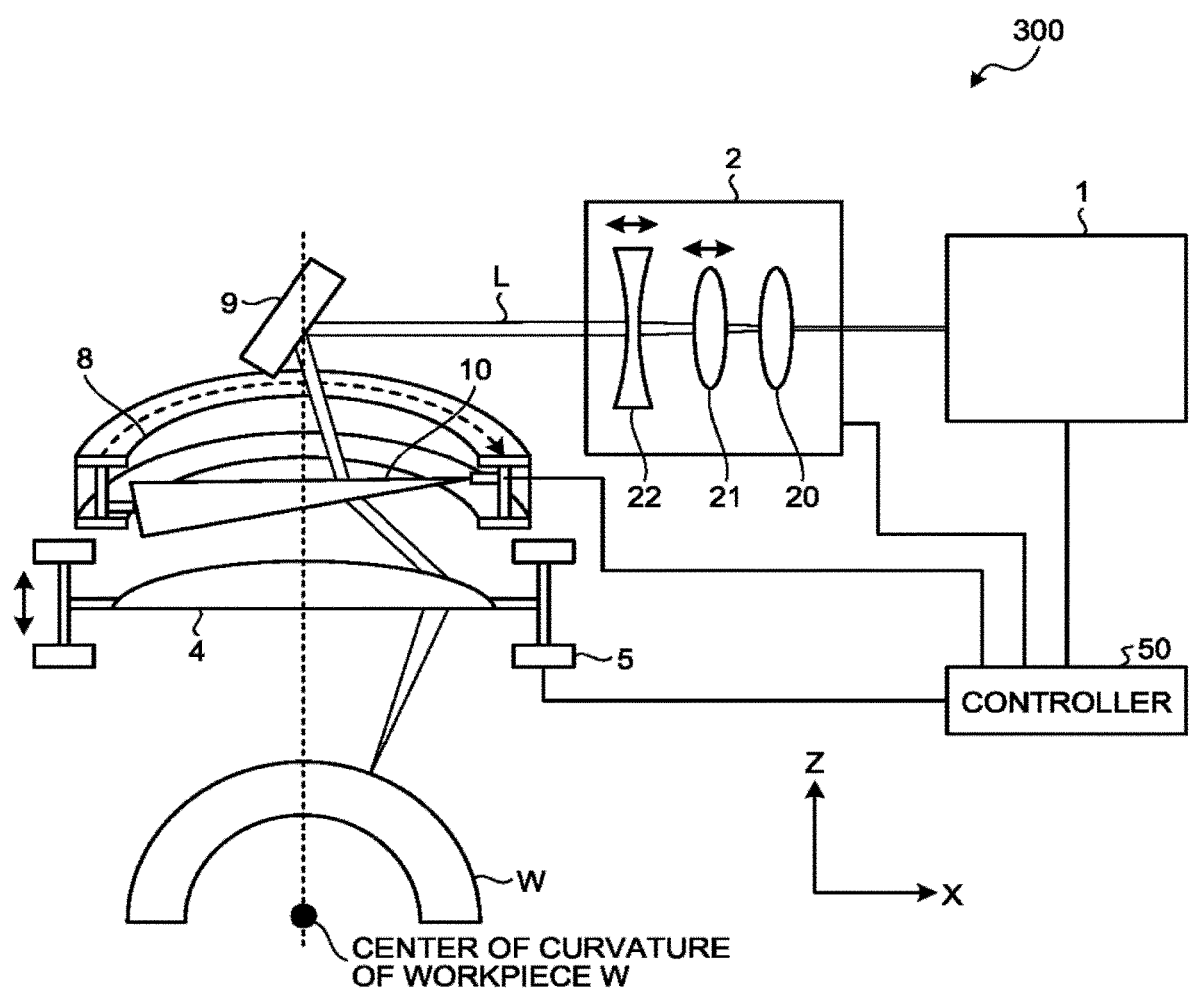
FIG. 12 is a sectional view illustrating a configuration of a laser machining apparatus according to a third embodiment of the present invention.

FIG. 12 is a sectional view illustrating a configuration of a laser machining apparatus 300 according to a third embodiment of the present invention. FIG. 12 illustrates an direction and a Z direction, with a direction perpendicular to the paper surface being direction. The optical axis of the focusing lens 4 corresponds with the 2 direction as indicated by the broken line. In the laser machining apparatus 300 according to the third embodiment, the galvano scanner 3 of the laser machining apparatus 100 according to the first embodiment is replaced by a plane mirror 9, a wedged prism 10, and a rotation mechanism 8. The controller 50 controls the rotation mechanism 8 in addition to controlling the laser oscillator 1, the focus position control mechanism 2, and the incident position control mechanism 5. The plane mirror 9 is fixed. The wedged prism 10 is a prism that deflects the laser beam L. The rotation mechanism 8 has a function of rotating the wedged prism 10 on a plane perpendicular to the optical axis of the focusing lens 4. The configuration and operation of the laser machining apparatus 300, with the exception of the plane mirror 9, the wedged prism 10, and the rotation mechanism 8, are similar to those of the laser machining apparatus 100 according to the first embodiment.

In the laser machining apparatus 300 of FIG. 12, the laser beam L emitted from the laser oscillator 1 passes through the focus position control mechanism 2 as in the laser machining apparatus 100 according to the first embodiment. Thereafter, the laser beam L is reflected by the plane mirror 9, is deflected by the wedged prism 10, and is focused by passing through the focusing lens 4 provided with the incident position control mechanism 5 to irradiate the workplace W.

The rotation mechanism 8 rotates the wedged prism 10 on the plane perpendicular to the optical axis of the focusing lens 4 to deflect the lacer beam L in the sweeping direction. Thus, the rotation mechanism 8 and the wedged prism notion as a laser beam deflector in a similar manner to the galvano scanner 3 of the first embodiment. The incident position control mechanism 5 of the laser machining apparatus 300 positions the entrance pupil position 6 of the focusing lens 4 such that it is on the wedged prism 10.

The incident position control mechanism 5 that changes the Z-direction distance between the wedged prism 10 and the focusing lens 4 may be provided for either the focusing lens 4 or the wedged prism 10. Alternatively, the wedged prism 10 and the focusing lens 4 may each be provided with the incident position control mechanism 5. Moreover, the wedged substrate 7 described in the second embodiment may be provided between the wedged prism 10 and the focusing lens 4. Variations in the incident position control mechanism 5 for such cases are similar to those described in the second embodiment.

By being provided with the rotation mechanism 9 and the wedged prism 10 in place of the galvano scanner 3, i.e., using a laser beam deflector that is different from the laser beam deflector of the laser machining apparatus 100 according to the first embodiment, the laser machining apparatus 300 according to the third embodiment can obtain effects similar to those of the first embodiment.

Fourth Embodiment

Figure 13:
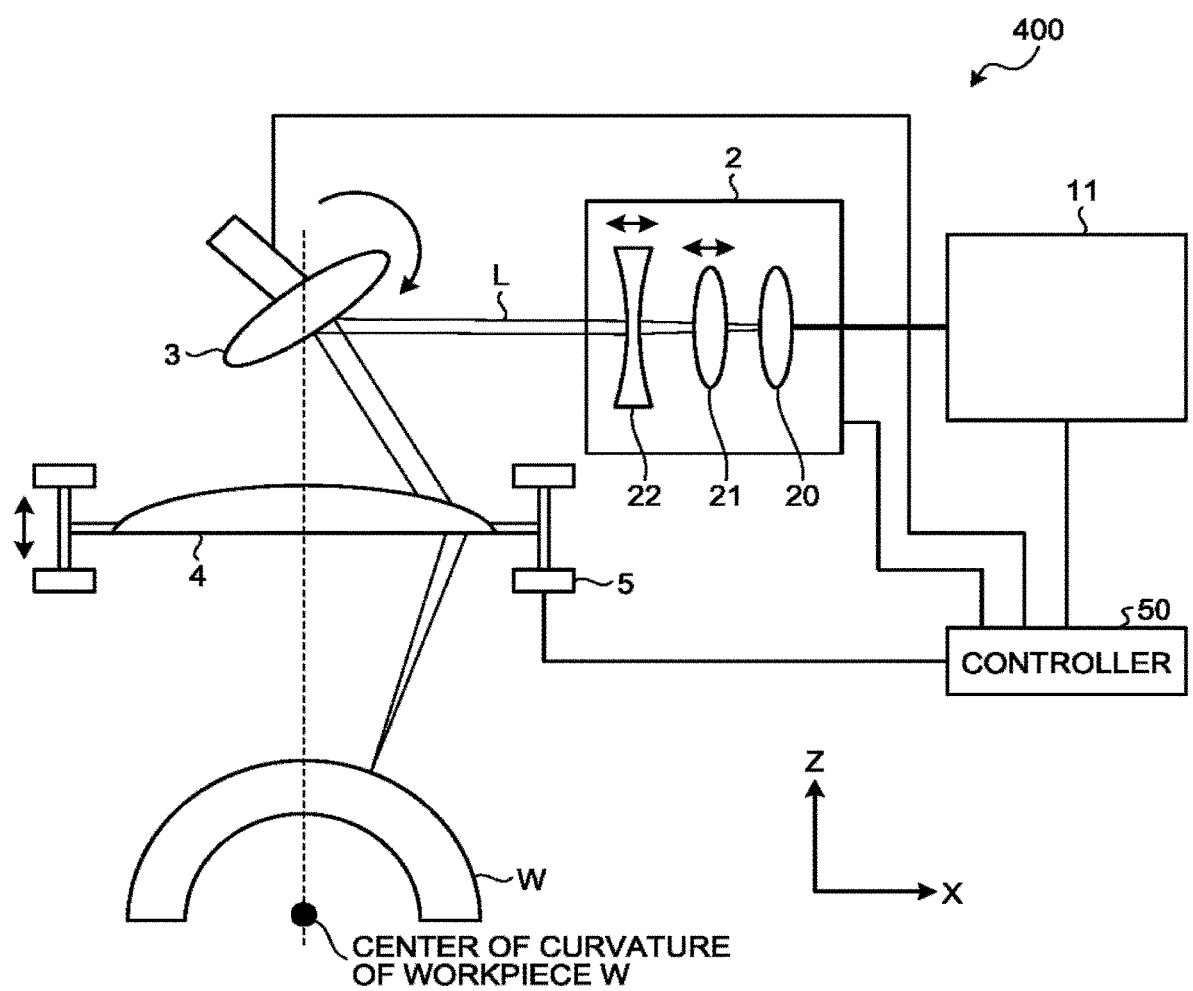
FIG. 13 is a sectional view illustrating a configuration of a laser machining apparatus according to a fourth embodiment of the present invention.

FIG. 13 is a sectional view illustrating a configuration of a laser machining apparatus 400 according to the fourth embodiment of the present invention. FIG. 13 illustrates an X direction and a 2 direction, with a direction perpendicular to the paper surface being a Y direction. The optical axis of the focusing lens 4 corresponds with the 2 direction as indicated by the broken line. The laser machining apparatus 400 according to the fourth embodiment uses a pulsed $CO_2$ laser 11 as the laser oscillator 1 in the laser machining apparatus 100 according to the first embodiment. The controller 50 controls the pulsed $CO_2$ laser 11, the focus position control mechanism 2, the galvano scanner 3, and the incident position control mechanism 5. The configuration and operation of the laser machining apparatus 400, with the exception of the pulsed $CO_2$ laser 11, are similar to those of the laser machining apparatus 100 according to the first embodiment.

In the laser machining apparatus 400 of FIG. 13, the laser beam L emitted from the pulsed $CO_2$ laser 11 passes through the focus position control mechanism 2 as in the laser machining apparatus 100 according to the first embodiment. Thereafter, the laser beam L is deflected by the galvano scanner 3 and is focused by passing through the focusing lens 4 provided with the incident position control mechanism 5 to irradiate the workpiece W.

When effects such as the thermal lens effect and others are taken into consideration, the pulsed $CO_2$ laser 11 can increase its laser output easily compared with a solid-state laser. Generally, there is a positive correlation between laser output and machining speed; therefore, the use of the pulsed COQ laser 11 enables an increase in machining speed. The use of the pulsed $CO_2$ laser 11 also enables high-quality machining. It is to be noted that the pulsed $CO_2$ laser 11 preferably has a laser wavelength ranging from 9 µm to 12 µm.

The incident position control mechanism 5 may be provided not for the focusing lens 4 but for the galvano scanner 3. Alternatively, the galvano scanner 3 and the focusing lens 4 may each be provided with the incident position control mechanism 5. Moreover, the wedged substrate 7 described in the second embodiment may be provided between the galvano scanner 3 and the focusing lens 4. Variations in the incident position control mechanism 5 for such cases are similar to those described in the second embodiment.

The incident diameter and the divergence angle of the laser beam L incident on the focusing lens 4 can also be adjusted by curvature adjustment or replacement of the outer surface of a partially reflecting mirror of the pulsed $CO_2$ laser 11; therefore, the partially reflecting mirror of the pulsed $CO_2$ laser 11 may be included in the focus position control mechanism 2.

A pulsed system that may be used for the pulsed $CO_2$ laser 11 is, for example, a Q-switching system that uses an acousto-optic device (acousto-optic modulator: AOM) or an electro-optic modulation device (electro-optic modulator: EOM); a cavity dumping system; or a gain switching system that causes intermittent oscillation to excited discharge.

Fifth Embodiment

Figure 14:
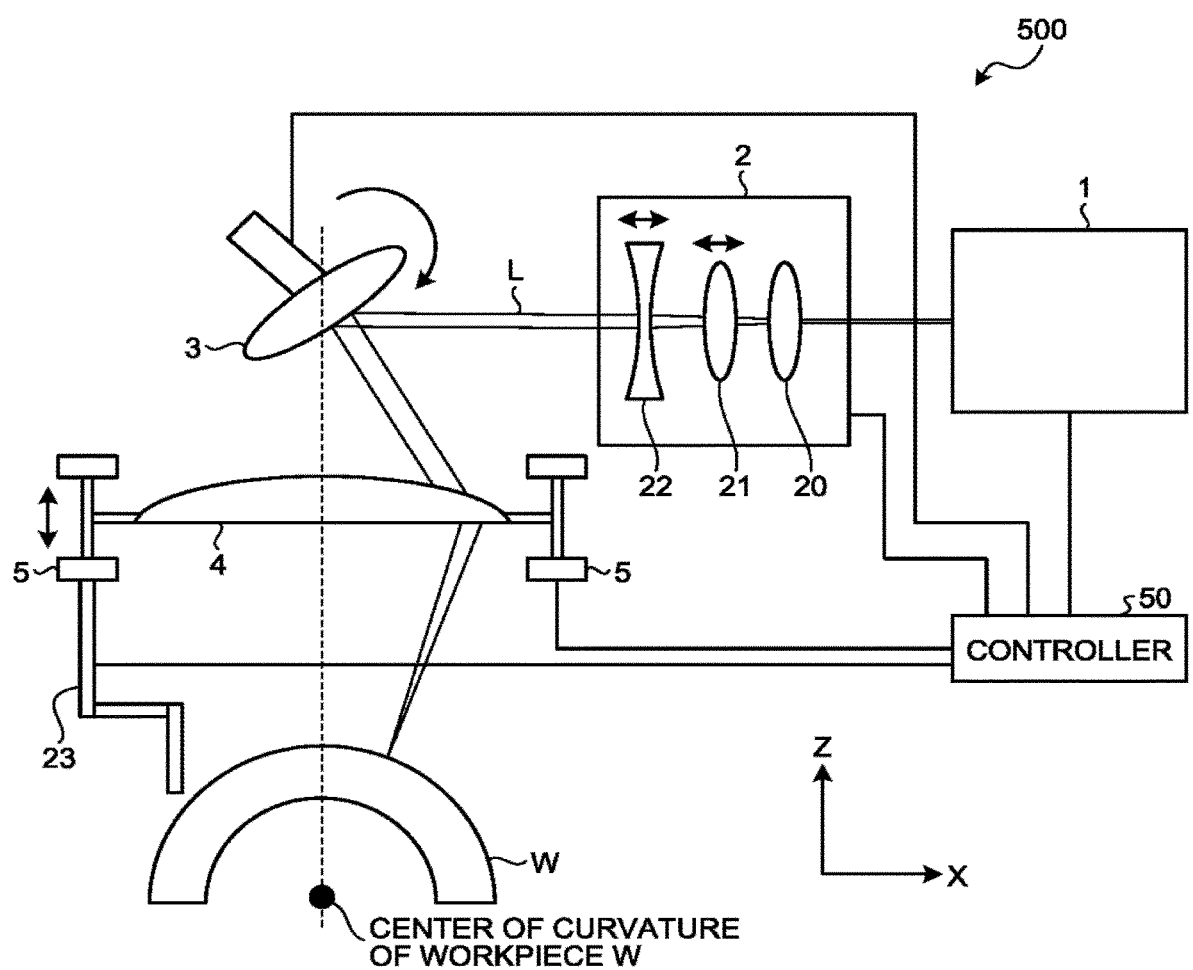
FIG. 14 is a sectional view illustrating a configuration of a laser machining apparatus according to a fifth embodiment of the present invention.

FIG. 14 is a sectional view illustrating a configuration of a laser machining apparatus 500 according to a fifth embodiment of the present invention. FIG. 14 illustrates an K direction and a Z direction, with a direction perpendicular to the paper surface being a Y direction. The optical axis of the focusing lens 4 corresponds with the Z direction as indicated by the broken line. In addition to the components of the laser machining apparatus 100 according to the first embodiment, the laser machining apparatus 500 according to the fifth embodiment further includes a distance measuring sensor 23. The distance measuring sensor 23 measures the distance to the workplace W to determine the shape of the workplace W and calculates the radius of curvature on the basis of the result of measurement. The laser machining apparatus 500 performs machining using data on the radius of curvature that is determined by the distance measuring sensor 23.

In the laser machining apparatus 500 of FIG. 14, the laser beam L emitted from the laser oscillator 1 passes through the focus position control mechanism 2 as in the laser machining apparatus 100 according to the first embodiment. Thereafter, the laser beam L is deflected by the galvano scanner 3 and is focused by passing through the focusing lens 4 provided with the incident position control mechanism 5 to irradiate the workpiece W. The data on the radius of curvature of the workpiece W determined by the distance measuring sensor 23 is read into the controller 50. Controlled variables of the focus position control mechanism 2 and the incident position control mechanism 5 are determined by using the data the radius of curvature determined by the distance measuring sensor 23. By using the data on the actual shape determined by the distance measuring sensor 23, the laser machining apparatus 500 can even deal with displacement of the shape of the workpiece N during machining.

It is to be noted that the distance measuring sensor 23 may determine the shape of the workpiece N, and the controller 50 may calculate the data on the radius of curvature of the workpiece W by using the result of the determination of the shape of the workpiece W.

If the laser machining apparatuses 200, 300, and 400 of the second, third, and fourth embodiments can each be provided with the distance measuring sensor 23, an effect similar to the above can be obtained.

The laser machining apparatus 500 is also capable of performing more accurate machining when the controller 50 obtains more detailed shape data on the workpiece W by checking the shape of the workpiece W determined by the distance measuring sensor 23 against CAD data on the workpiece W that the controller 50 has read beforehand.

Figure 15:
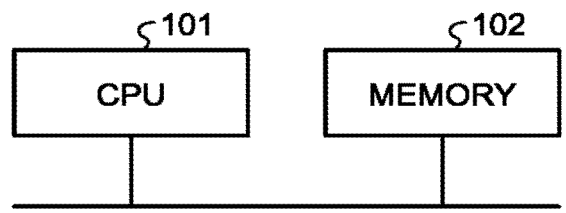
FIG. 15 is a diagram illustrating a hardware configuration when functions of the controller according to each of the first through fifth embodiments are implemented by a computer system.

FIG. 15 is a diagram illustrating a hardware configuration when functions of the controller 50 according to each of the first through fifth embodiments are implemented by a computer system. This means that the controller 50 according to each of the first through fifth embodiments can be implemented in such a computer system as illustrated in FIG. 15. In this case, the functions of the controller 50 are implemented by a central processing unit (CPU) 101 and a memory 102. The functions of the controller 50 are implemented by means of software, firmware, or a combination of software and firmware. The software or the firmware is described as a program and is stored in the memory 102. The CPU 101 implements each of the functions of the controller 50 by reading and executing the program stored in the memory 102. This means that the computer system includes the memory 102 that stores programs containing steps of performing operations to execute the functions of the controller 50. These programs can also be regarded as programs that cause a computer to execute a procedure or a method of the controller 50. The memory 102 here corresponds to a nonvolatile or volatile semiconductor memory, such as a random-access memory (RAM), a read-only memory (ROM), a flash memory, an erasable programmable read-only memory (EPROM), or an electrically erasable programmable read-only memory (EEPROM) (registered trademark); a magnetic disk; a flexible disk; an optical disk; a compact disk; a mini disk; or a digital versatile disk (DVD).

Figure 16:
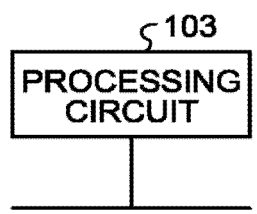
FIG. 16 is a diagram illustrating a configuration when the functions of the controller according to each of the first through fifth embodiments are implemented by dedicated hardware.

FIG. 16 is a diagram illustrating a configuration when the functions of the controller 50 according to each of the first through fifth embodiments are implemented by dedicated hardware. As illustrated in FIG. 16, the controller 50 may be configured from a processing circuit 103 that is dedicated hardware. The processing circuit 103 corresponds to a single circuit, a composite circuit, a programmed processor, a parallel programmed processor, an application specific integrated circuit (ASIC), a field-programmable gate array (FPGA), or a combination of these.

The above configurations illustrated in the embodiments are examples of an aspect of the present invention, and they can be combined with other techniques that are publicly known and they can be partly omitted or changed without departing from the gist of the present invention.

REFERENCE SIGNS LIST 1 laser oscillator; 2 focus position con mechanism; 3 galvano scanner; 4 focusing lens; 5 incident position control mechanism; 6 entrance pupil position; 7 wedged substrate; 8 rotation mechanism; 9 plane mirror; 10 wedged prism; 11 pulsed $CO_2$ laser; 20, 21, 22 lens; 23 distance measuring sensor; 50 controller; 100, 200, 300, 400, 500 laser machining apparatus; 101 CPU; 102 memory; 103 processing circuit; L laser beam; W workpiece.

The invention claimed is:

1. A laser machining apparatus comprising:
a laser oscillator to emit a laser beam;
a focusing lens to irradiate a workpiece with the laser beam;
a focus position control mechanism to control a divergence angle of the laser beam and an incident diameter of the laser beam incident on the focusing lens, the focus position control mechanism being disposed between the laser oscillator and the focusing lens and being disposed on an optical path of the laser beam;
a laser beam deflector to deflect the laser beam before the laser beam is incident on the focusing lens;
an emitting angle control mechanism to change a distance between the laser beam deflector and the focusing lens by moving the focusing lens along an optical axis of the focusing lens; and
a controller o control, while the laser beam sweeps over the workpiece, an irradiation diameter of the laser beam on a surface of the workpiece and a focus position of the laser beam along the optical axis by controlling the focus position control mechanism on a basis of a shape of the workpiece, and
the controller further controls an exit angle of the laser beam exiting from the focusing lens wherein the controller is configured to control the exit angle of the laser beam based on the shape of the workpiece.

2. The laser machining apparatus according to claim 1, wherein the laser beam deflector is an acousto-optic deflector.

3. The laser machining apparatus according to claim 1, wherein the laser beam deflector includes a prism and a rotation mechanism that rotates the prism on a plane perpendicular to an optical axis of the focusing lens.

4. The laser machining apparatus according to claim 1, wherein the laser oscillator is a pulsed CO2 laser.

5. The laser machining apparatus according to claim 1, wherein the controller controls the emitting angle control mechanism on a basis of a radius of curvature of the workpiece such that the laser beam is perpendicularly incident on the workpiece.

6. The laser machining apparatus according to claim 1, wherein the controller controls the emitting angle control mechanism on a basis of a radius of curvature of the workpiece such that a focus position of the laser beam is adjusted onto the workpiece.

7. The laser machining apparatus according to claim 1, wherein the controller is configured to control the exit angle of the laser beam so that the laser beam is perpendicularly incident on a curved portion of the workpiece.

8. The laser machining apparatus according to claim 1, wherein the exit angle is an acute angle with respect to a bottom surface of the focusing lens.

9. The laser machining apparatus according to claim 1, wherein the exit angle is an acute angle with respect to a central optical axis of the focusing lens.

10. A laser machining apparatus comprising:
a laser oscillator to emit a laser beam;
a focusing lens to irradiate a workpiece with the laser beam;
a focus position control mechanism to control a divergence angle of the laser beam and an incident diameter of the laser beam incident on the focusing lens, the focus position control mechanism being disposed between the laser oscillator and the focusing lens and being disposed on an optical path of the laser beam;
a laser beam deflector to deflect the laser beam before the laser beam is incident on the focusing lens:
an emitting angle control mechanism to change a distance between the laser beam deflector and the focusing lens by moving the focusing lens along an optical axis of the focusing lens; and
a controller to control, while the laser beam sweeps over the workpiece an irradiation diameter of the laser beam on a surface of the workpiece and a focus position of the laser beam along the optical axis by controlling the focus position control mechanism on a basis of a shape of the workpiece, and
the controller further controls an exit angle of the laser beam exiting from the focusing lens, wherein the controller is configured to control the emitting angle control mechanism to arrange an entrance pupil position of the focusing lens on a surface of the laser beam deflector.

11. A laser machining apparatus comprising:
a laser oscillator to emit a laser beam;
a focusing lens to irradiate a workpiece with the laser beam;
a focus position control mechanism to control a divergence angle of the laser beam and an incident diameter of the laser beam incident on the focusing lens, the focus position control mechanism being disposed between the laser oscillator and the focusing lens and being disposed on an optical path of the laser beam;
a laser beam deflector to deflect the laser beam before the laser beam is incident on the focusing lens;
an emitting angle control mechanism to change a distance between the laser beam deflector and the focusing lens by moving the focusing lens along an optical axis of the focusing lens; and
a controller to control while the laser beam sweeps over the workpiece, an irradiation diameter of the laser beam on a surface of the workpiece and a focus position of the laser beam along the optical axis by controlling the focus position control mechanism on a basis of a shape of the workpiece, and
the controller further controls an exit angle of the laser beam exiting from the focusing lens,
wherein the controller controls the emitting angle control mechanism to control an incident angle of the laser beam on the workpiece.

* * * * *